US009432935B2

(12) United States Patent
Ishii et al.

(10) Patent No.: US 9,432,935 B2
(45) Date of Patent: *Aug. 30, 2016

(54) MOBILE COMMUNICATION SYSTEM, BASE STATION, MOBILE STATION, AND POWER-SAVING TRANSMISSION AND RECEPTION METHOD USED IN THEM

(71) Applicant: NEC CORPORATION, Tokyo (JP)

(72) Inventors: Naoto Ishii, Tokyo (JP); Jinsock Lee, Tokyo (JP)

(73) Assignee: NEC CORPORATION, Tokyo (JP)

( * ) Notice: Subject to any disclaimer, the term of this patent is extended or adjusted under 35 U.S.C. 154(b) by 413 days.

This patent is subject to a terminal disclaimer.

(21) Appl. No.: 13/944,984

(22) Filed: Jul. 18, 2013

(65) Prior Publication Data

US 2013/0301506 A1    Nov. 14, 2013

Related U.S. Application Data

(63) Continuation of application No. 13/357,333, filed on Jan. 24, 2012, now Pat. No. 8,514,727, which is a continuation of application No. 12/089,853, filed as application No. PCT/JP2006/321376 on Oct. 26, 2006, now Pat. No. 8,130,685.

(30) Foreign Application Priority Data

Oct. 28, 2005  (JP) ................................. 2005-314502

(51) Int. Cl.
*G08C 15/00*  (2006.01)
*G08C 17/00*  (2006.01)
(Continued)

(52) U.S. Cl.
CPC ........ *H04W 52/0209* (2013.01); *H04L 1/1887* (2013.01); *H04W 52/0216* (2013.01); *H04W 76/048* (2013.01); *Y02B 60/50* (2013.01)

(58) Field of Classification Search
None
See application file for complete search history.

(56) References Cited

U.S. PATENT DOCUMENTS 6,085,222 A    7/2000  Fujino et al.
6,240,083 B1    5/2001  Wright et al.
(Continued)

FOREIGN PATENT DOCUMENTS

CN    1424859 A    6/2003
CN    1640163 A    7/2005
(Continued)

OTHER PUBLICATIONS

IEEE P802.16e/D9, Jun. 2005, pp. 164-170, IEEE.
(Continued)

*Primary Examiner* — Kenny Lin
(74) *Attorney, Agent, or Firm* — Sughrue Mion, PLLC

(57) ABSTRACT

Provided is a mobile station which communicates with abase station using a radio channel, the mobile station comprising: a switching unit configured to switch from a packet reception period, during which packet reception can be executed, to a packet reception halt period, during which packet reception is halted; a transmission unit configured to transmit, to the base station, a result of receiving a packet sent from the base station, as a reception result notification signal; a packet reception determination unit configured to determine a packet reception fault; and a reception period determination unit configured to extend the packet reception period if the packet reception fault is determined by the packet reception determination unit.

7 Claims, 10 Drawing Sheets

(51) Int. Cl.
*H04W 52/02* (2009.01)
*H04W 76/04* (2009.01)
*H04L 1/18* (2006.01)

(56) References Cited

U.S. PATENT DOCUMENTS

| | | |
|---|---|---|
| 6,978,149 B1 | 12/2005 | Morelli et al. |
| 2003/0039267 A1 | 2/2003 | Koo et al. |
| 2005/0157671 A1 | 7/2005 | Sugitani |
| 2006/0029024 A1 | 2/2006 | Zeng et al. |
| 2006/0034245 A1 | 2/2006 | Nguyen |
| 2006/0114865 A1 | 6/2006 | Hashimoto et al. |

FOREIGN PATENT DOCUMENTS

| | | |
|---|---|---|
| CN | 1685646 A | 10/2005 |
| GB | 2369963 A | 6/2002 |
| JP | 7-162941 A | 6/1995 |
| JP | 9-98131 A | 4/1997 |
| JP | 9-162798 A | 6/1997 |
| JP | 10-210563 A | 8/1998 |
| JP | 2002-271380 A | 9/2002 |
| JP | 2003-110582 A | 4/2003 |
| JP | 2004-147050 A | 5/2004 |
| JP | 2004-234667 A | 8/2004 |
| JP | 2005-026862 A | 1/2005 |
| WO | 2004/030251 A1 | 4/2004 |

OTHER PUBLICATIONS

Communication dated Nov. 2, 2011, issued by the Japanese Patent Office in corresponding Japanese Patent Application No. 2009-147797.

Extended European Search Report, dated Sep. 6, 2012, issued in counterpart European Patent Application No. 06822352.8.

Communication dated Aug. 5, 2014, issued by the State Intellectual Property Office of the People's Republic of China in corresponding Application No. 201210385301.1.

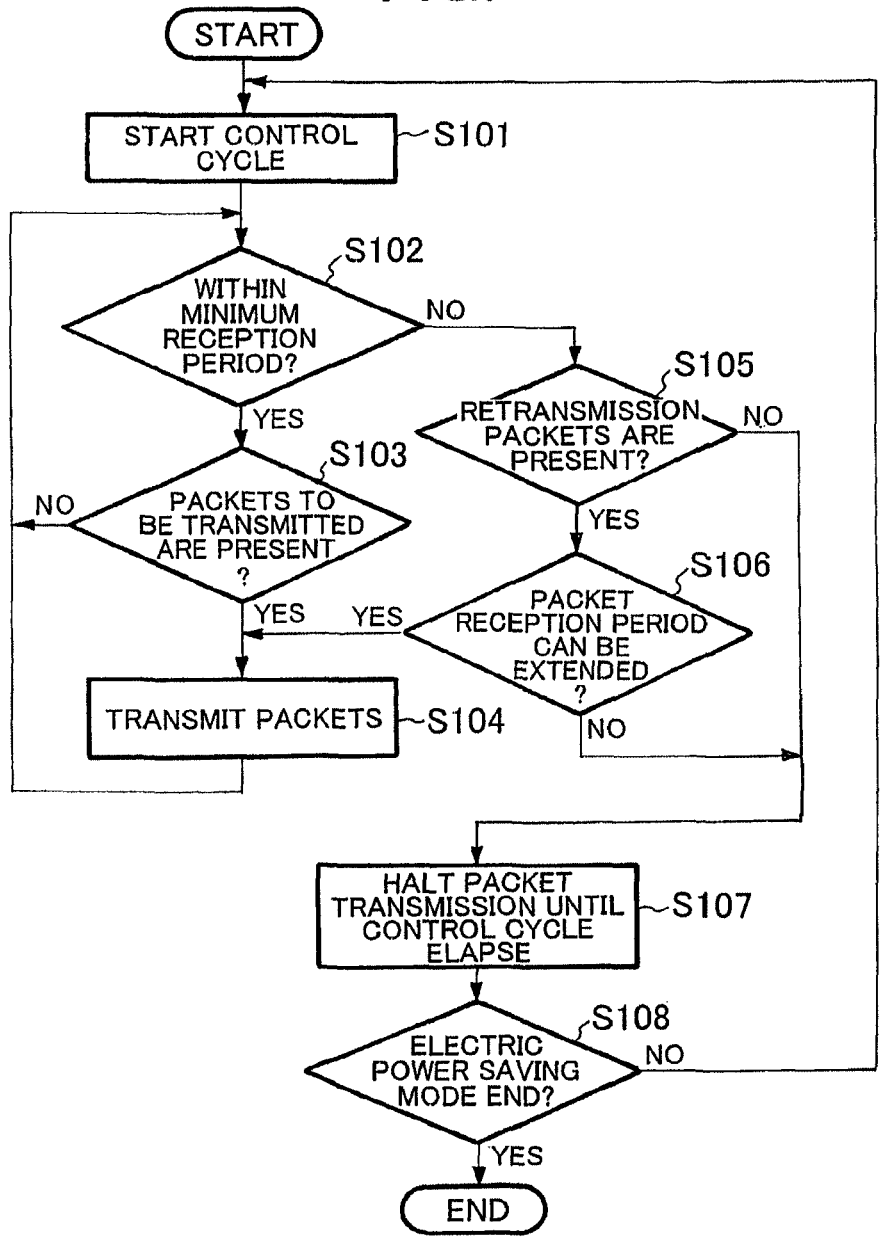

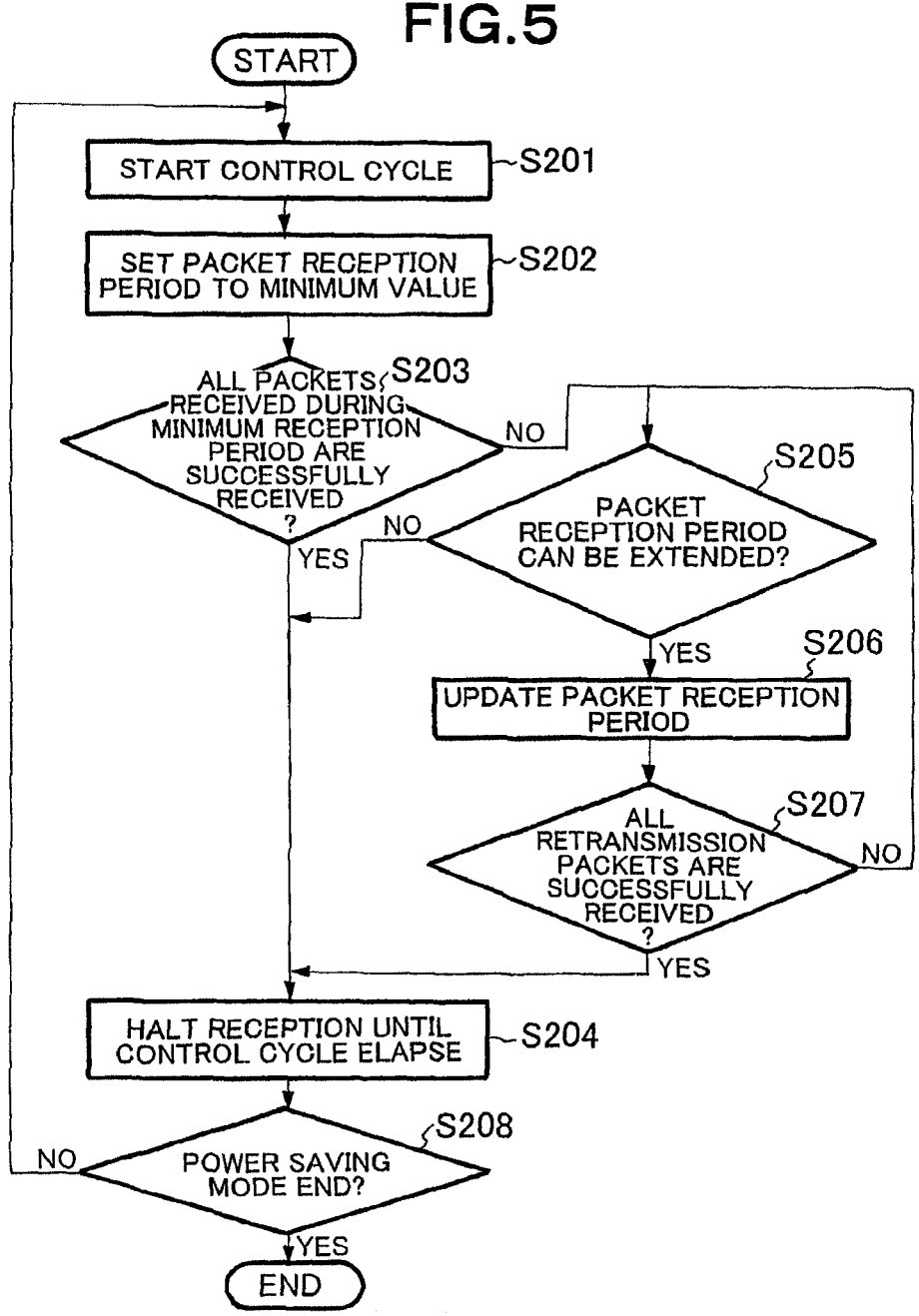

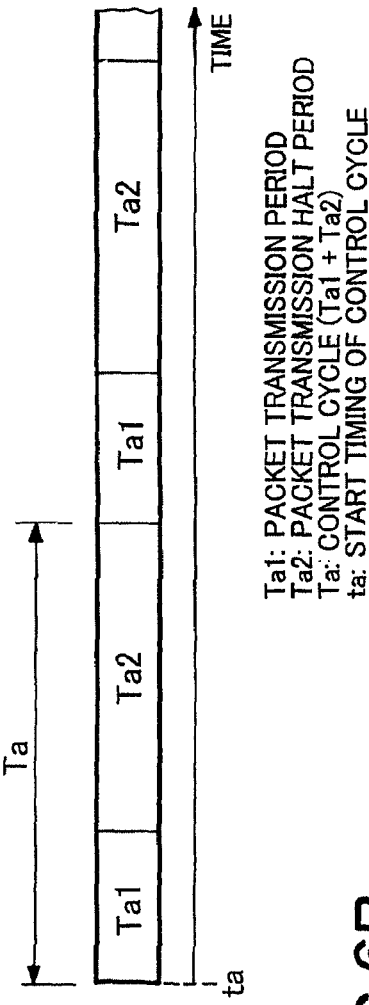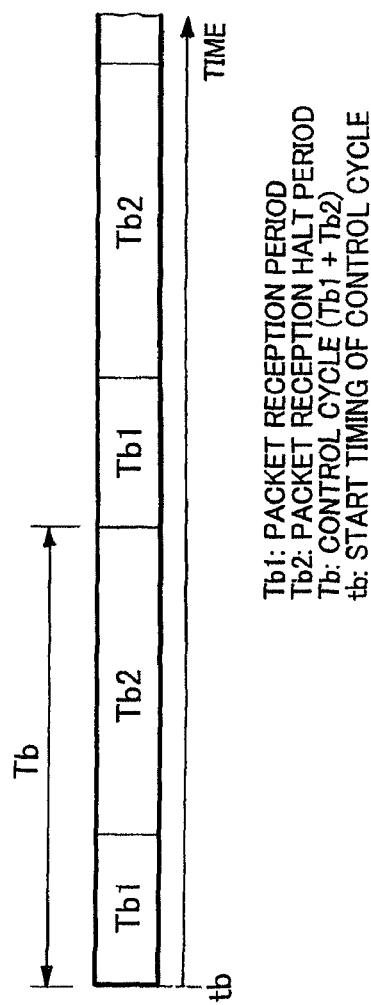

Tbmin: MINIMUM RECEPTION PERIOD
Tbmax: MAXIMUM RECEPTION PERIOD

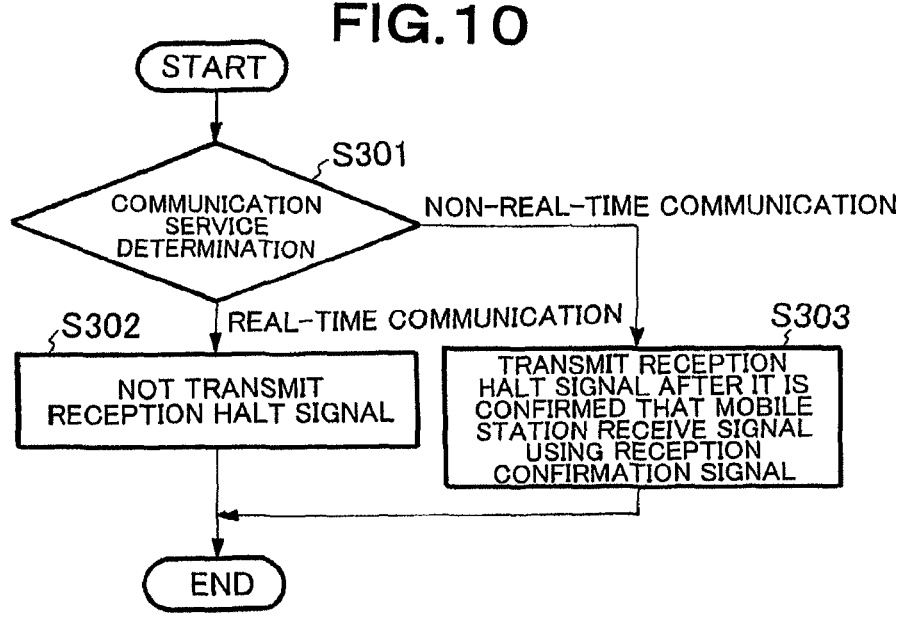
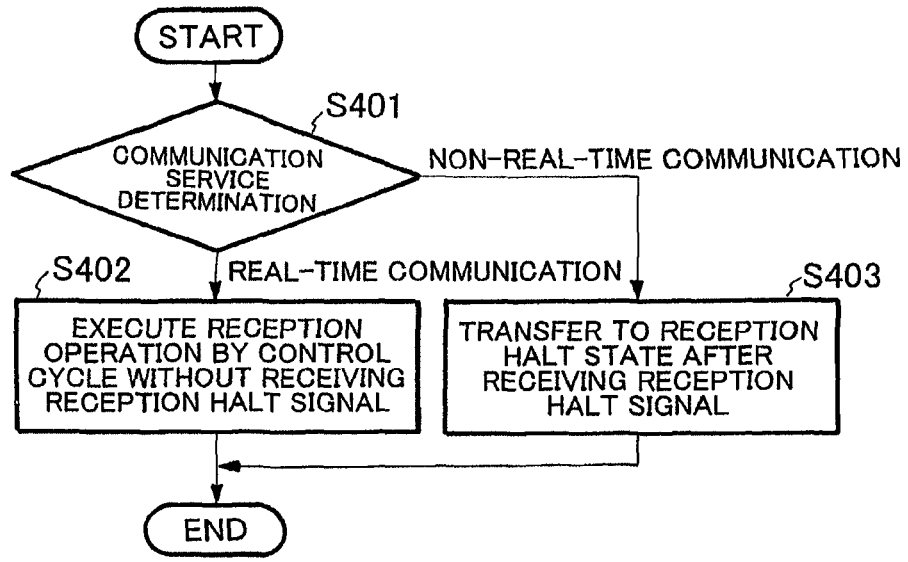

MOBILE COMMUNICATION SYSTEM, BASE STATION, MOBILE STATION, AND POWER-SAVING TRANSMISSION AND RECEPTION METHOD USED IN THEM

This is a Continuation Application of U.S. application Ser. No. 13/357,333 filed Jan. 24, 2012, which is a Continuation of U.S. application Ser. No. 12/089,853 filed on Apr. 10, 2008, which claims priority from National Stage Application No. PCT/JP2006/321376 filed Oct. 26, 2006, which claims priority from Japanese Patent Application No. 2005-314502 filed on Oct. 28, 2005, the disclosures of which are incorporated herein by reference in their entirety.

TECHNICAL FIELD

The present invention relates to a mobile communication system, a base station, a mobile station, and a power-saving transmission and reception method used in them, and more particularly, to a mobile communication system which changes the ratio of a packet reception period and a packet reception halt period according to the situation of receiving packets so as to save electric power of a mobile station, a base station, a mobile station, and a power-saving transmission and reception method used in them.

BACKGROUND ART

In a cellular system, the operable time of a mobile station is dependent on the reception operation and circuit size. From this point of view, as a method to suppress the power consumption of a mobile station, intermittent reception is an effective technique, under which a reception circuit is made to operate only when data to be received is present, but the reception circuit is made to halt when data to be received is not present.

For example, as the first conventional technique, there is employed a method in which, regarding the intermittent reception of a mobile station with respect to a traffic under which data is transmitted with a substantially constant cycle such as the VoIP (Voice over IP) that communicates sound using packets, the standardization is being promoted as the IEEE 802. 16e by the IEEE (Institute of Electrical and Electronic Engineers) (refer to Non-Patent Document 1).

Under this system, as shown in FIG. 12, the period in which the reception function is halted is referred to as Sleep Window, while the standby period is referred to as Listening Window, and both of them are repeated alternately. The Listening Window and Sleep Window are predetermined fixed time periods. According to this system, the total of both the periods being the unit of the repetition of the Listening Window and Sleep Window is set to a control cycle, and the intermittent reception of a mobile station is controlled with the control cycle.

According to the intermittent reception system using the Sleep Window and Listening Window shown in FIG. 12, firstly, a base station or a mobile station transmits a message of starting the intermittent reception. Then, the base station transmits a frame number to start the Sleep Window to the mobile station, and starts the intermittent reception. After starting the intermittent reception, during the period of the Listening Window, the base station transmits data to the mobile station, and the mobile station receives the data. On the other hand, during the period of the Sleep Window, the base station halts transmitting data to the mobile station, and the mobile station halts receiving the data.

Furthermore, as the second conventional technique, under the HSDPA (High Speed Downlink Packet Access) system in which the standardization is performed by the 3GPP (3rd Generation Partnership Project), a reception method of performing the intermittent reception is considered (refer to Patent Document 1).

According to this system, a base station transmits state update information indicative of whether or not reception of packets is possible for each state update frame, and, when confirming that the state update information indicates that reception is possible, a mobile station receives packets. Alternatively, even if the state update information cannot be correctly received due to the fault of the communication path, the mobile station receives packets. On the other hand, when confirming that the state update information indicates that reception is impossible, the mobile station halts receiving packets.

In both the above-described first and second conventional techniques, there is employed the HARQ (Hybrid Automatic ReQuest) under which, after receiving data, the mobile station determines whether or not data is received without an error, and transmits the determination result to the base station as a reception result notification signal. According to the HARQ, the base station can determine whether or not data should be retransmitted based on the reception result notification signal transmitted from the mobile station, which increases the transmitting efficiency by the retransmission control.

Furthermore, as the third conventional technique, there are disclosed a method and a system that manage the power consumption within a portable terminal (refer to Patent Document 2). According to the technique, when data is transmitted, the reception period is extended, while when data is not transmitted, the state is set to the reception halt state.

Furthermore, as the fourth conventional technique, there is disclosed a technique in which, in a receiving device that performs the intermittent operation whose reception period is short in the state in which the reception start signal is not received, and extends the reception period when receiving the reception start signal, the power consumption is suppressed to the requisite minimum (refer to Patent Document 3). According to the technique, the cycle of the intermittent operation is extended based on the situation that the reception period is extended due to an abnormal signal, and the cycle of the intermittent operation is reduced based on the situation that the reception period is not extended.

[Patent Document 1] JP-A 2004-147050
[Patent Document 2] JP-A 2004-234667
[Patent Document 3] JP-A 10-210563
[Non-Patent Document 1] IEEE P802. 16e/D9, June 2005, pp. 164-170

DISCLOSURE OF THE INVENTION

Problems to be Solved by the Invention

However, in the system in which the fixed reception period and fixed reception halt period are repeated alternately with respect to the traffic which transmits data with a constant control cycle as the above-described first conventional technique, there is raised a problem that, even if all the data is transmitted during the reception period, the reception period cannot be switched to the reception halt period. That is, even if receiving all the packets is completed during the packet reception period, the mobile station continues the packet reception period until receiving a packet reception halt signal from the base station. Accordingly, although there is no occasion to receive packets, power is unnecessarily consumed by continuing the reception processing.

Furthermore, when applying the system of the intermittent reception to the communication system that performs the retransmission control such as the HARQ, in case the retransmission is not completed during the reception period, the retransmission is delayed to the reception period of the next control cycle. Especially, in case of the traffic for which the real-time property is required such as the sound communication, there is raised a problem that required conditions are not fulfilled and packets are broken to lower the QoS (Quality of Service).

Under the above-described second conventional technique, when transferring to the reception halt state, it is necessary to receive a notification from the base station. Thus, there is raised a problem that, when the state update information is faulty, since the reception state is continued, transition to the reception halt state is delayed.

Similarly, under the above-described third conventional technique, when transferring to the reception halt state, it is necessary to transmit a message of the transfer. Further, when the message is faulty, since the reception state is continued, transition to the reception halt state is delayed. The above-described fourth conventional technique changes the control cycle itself of the intermittent reception, and cannot be applied to a technique in which it is premised that the control cycle of the intermittent reception is constant as the above-described first conventional technique.

It is therefore an object of the present invention to solve the above-described problems. Therefore, the present invention has an object to provide a power-saving transmission and reception system that, in the packet communication method in which the retransmission control such as the HARQ is conducted and the reception period and reception halt period for packets are repeated alternately with a constant control cycle, elongates the ratio of the reception halt period with respect to the reception period for packets within the control cycle to reduce the power consumption of a mobile station.

Means for Solving the Problems

To achieve the above-described object, according to the present invention, there is provided a mobile communication system includes a base station; and a mobile station, wherein a radio channel is set between the base station and mobile station, the base station alternately repeating a packet transmission period during which packets are transmitted and a packet transmission halt period during which transmission of the packets is halted with a predetermined control cycle at the time of the packet communication using the radio channel, and, after transmitting packets to the mobile station, determining whether or not retransmission packets should be transmitted based on a reception result notification signal from the mobile station, the mobile station alternately repeating a packet reception period during which packets are received and a packet reception halt period during which reception of the packets is halted with a predetermined control cycle at the time of the packet communication using the radio channel, and sending the reception result with respect to the packets to the base station as the reception result notification signal, wherein the base station includes a packet retransmission means for transmitting the retransmission packets with the packet transmission period extended in the control cycle based on the reception result notification signal, and the mobile station includes: a packet reception means for receiving the packets by starting the packet reception period according to the start of the packet transmission period of the base station; a reception period extension means for extending the packet reception period in the control cycle based on the reception result with respect to the packets received during the packet reception period; and a packet reception halt means for halting the packet reception by switching from the packet reception period to the packet reception halt period in the control cycle based on the reception result.

According to the present invention, the reception period extension means may include a means for extending the packet reception period by a predetermined time period in the control cycle when receiving the packets faultily. Furthermore, the reception period extension means may include a means for further extending the packet reception period in the control cycle when the extended packet reception period is shorter than a predetermined reception period. The packet reception halt means may notify that the packets are correctly received as the reception result notification signal, and switch from the packet reception period to the packet reception halt period in the control cycle when the packets received during the packet reception period are correctly received to halt the packet reception.

According to the present invention, it is desirable that the packet communication using the radio channel is a packet communication by a predetermined service. The base station may further include a means for sending a packet reception halt notification signal to the mobile station when switching to the packet transmission halt period at the time of the packet communication by a service other than the predetermined service, and the mobile station may further include a means for halting the packet reception by switching from the packet reception period to the packet reception halt period in case of receiving the packet reception halt notification signal at the time of the packet communication by a service other than the predetermined service. The packet communication by the predetermined service may be a real-time communication. The packet communication by a service other than the predetermined service may be a non-real-time communication.

According to the present invention, it is desirable that the packet reception period is dynamically changed between a predetermined minimum reception period and a predetermined maximum reception period under the condition that the control cycle is constant. Furthermore, it is desirable that the maximum reception period is equal to the control cycle or lower.

According to the present invention, there is also provided a base station of a mobile communication system, the base station alternately repeating a packet transmission period during which packets are transmitted and a packet transmission halt period during which transmission of the packets is halted with a predetermined control cycle at the time of the packet communication using a radio channel which is set between the base station and a mobile station, and, after transmitting packets to the mobile station, determining whether or not retransmission packets should be transmitted based on a reception result notification signal from the mobile station, the base station including: a packet retransmission means for transmitting the retransmission packets with the packet transmission period extended in the control cycle based on the reception result notification signal.

According to the present invention, there is also provided a mobile station of a mobile communication system, the mobile station alternately repeating a packet reception period during which packets are received and a packet reception halt period during which reception of the packets is halted with a predetermined control cycle at the time of the packet communication using a radio channel which is set between the mobile station and a base station, and sending the reception result with respect to packets sent from the base station to the base station as a reception result notification signal, the mobile station including: a packet reception means for receiving the packets in the packet reception period according to the start of a packet transmission period of the base station; a reception period extension means for extending the packet reception period in the control cycle based on the reception result with respect to the packets received during the packet reception period; and a packet reception halt means for halting the packet reception by switching from the packet reception period to the packet reception halt period in the control cycle based on the reception result.

According to the present invention, there is also provided a power-saving transmission and reception method for a mobile communication system, comprising: setting a radio channel between a base station and a mobile station, at the base station, alternately repeating a packet transmission period during which packets are transmitted and a packet transmission halt period during which transmission of the packets is halted with a predetermined control cycle at the time of the packet communication using the radio channel, and, after transmitting packets to the mobile station, determining whether or not retransmission packets should be transmitted based on a reception result notification signal; at the mobile station, alternately repeating a packet reception period during which the packets are received and a packet reception halt period during which reception of the packets is halted with a predetermined control cycle at the time of the packet communication using the radio channel, and sending the reception result with respect to the packets to the base station as the reception result notification signal; at the base station, transmitting the retransmission packets with the packet transmission period extended in the control cycle based on the reception result notification signal; at the mobile station, receiving the packets in the packet reception period according to the start of the packet transmission period of the base station; extending the packet reception period in the control cycle based on the reception result with respect to the packets received during the packet reception period; and halting the packet reception by switching from the packet reception period to the packet reception halt period in the control cycle based on the reception result.

According to the present invention, there is also provided a power-saving transmission and reception method for a base station, comprising: alternately repeating a packet transmission period during which packets are transmitted and a packet transmission halt period during which transmission of the packets is halted with a predetermined control cycle at the time of the packet communication using a radio channel which is set between the base station and a mobile station, and, after transmitting packets to the mobile station, determining whether or not retransmission packets should be transmitted based on a reception result notification signal from the mobile station; and transmitting the retransmission packets with the packet transmission period extended in the control cycle based on the reception result notification signal.

According to the present invention, there is also provided a power-saving transmission and reception method for a mobile station, comprising: alternately repeating a packet reception period during which packets are received and a packet reception halt period during which reception of the packets is halted with a predetermined control cycle at the time of the packet communication using a radio channel which is set between the mobile station and a base station, and sending the reception result with respect to the packets sent from the base station to the base station as a reception result notification signal: receiving the packets in the packet reception period according to the start of a packet transmission period of the base station; extending the packet reception period in the control cycle based on the reception result with respect to the packets received during the packet reception period; and halting the packet reception by switching from the packet reception period to the packet reception halt period in the control cycle based on the reception result.

According to the present invention, there is also provided a power-saving transmission and reception program for a base station, the base station alternately repeating a packet transmission period during which packets are transmitted and a packet transmission halt period during which transmission of the packets is halted with a predetermined control cycle at the time of the packet communication using a radio channel which is set between the base station and a mobile station, and, after transmitting packets to the mobile station, determining whether or not retransmission packets should be transmitted based on a reception result notification signal from the mobile station, the program enabling a computer to execute: a step of transmitting the retransmission packets with the packet transmission period extended in the control cycle based on the reception result notification signal.

According to the present invention, there is also provided a power-saving transmission and reception program for a mobile station, the mobile station alternately repeating a packet reception period during which packets are received and a packet reception halt period during which reception of the packets is halted with a predetermined control cycle at the time of the packet communication using a radio channel which is set between the mobile station and a base station, and sending the reception result with respect to the packets sent from the base station to the base station as a reception result notification signal, the program enabling a computer to execute: a step of receiving the packets in the packet reception period according to the start of a packet transmission period of the base station; a step of extending the packet reception period in the control cycle based on the reception result with respect to the packets received during the packet reception period; and a step of halting the packet reception by switching from the packet reception period to the packet reception halt period in the control cycle based on the reception result.

Advantages of the Invention

According to the present invention, in the packet communication method in which the reception period and the reception halt period for packets are alternately repeated with a constant control cycle, it is possible to provide a power-saving transmission and reception system that can elongate the reception halt period with respect to the reception period for packets in the control cycle to reduce the power consumption of a mobile station.

BRIEF DESCRIPTION OF THE DRAWINGS

FIG. 4 shows a flowchart indicative of the operation of the base station shown in FIG. 2;

FIG. 5 shows a flowchart indicative of the operation of the mobile station shown in FIG. 3;

FIGS. 6A and 6B show a schematic diagram to explain a control cycle for the intermittent reception of the mobile station with a predetermined start timing;

FIG. 10 shows a flowchart indicative of the operation of the base station shown in FIG. 8;

FIG. 11 shows a flowchart indicative of the operation of the mobile station shown in FIG. 9.

EXPLANATION OF REFERENCE SYMBOLS

Figure 1:
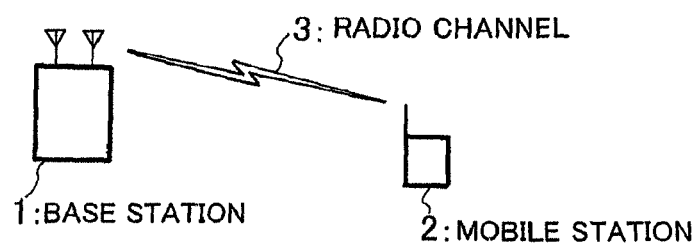
FIG. 1 shows a view indicative of a mobile communication system according to the first exemplary embodiment of the present invention.

1: Base station
2: Mobile station
3: Radio channel
11, 21: Antenna
12, 22: Duplexer
13, 23: Reception unit
14, 24: User data separation unit
15: Packet transmission control unit
16: Signal generation unit
17, 29: Transmission unit
18, 30: Call control unit
25: Packet reception determination unit
26: Reception period determination unit
27: Packet control signal generation unit
28: Signal synthesis unit

BEST MODE FOR CARRYING OUT THE INVENTION

Now, preferred exemplary embodiments of the present invention will be described by referring to the accompanying drawings.

First Exemplary Embodiment

FIG. 1 shows a view indicative of the configuration of a mobile communication system according to the first exemplary embodiment of the present invention.

In FIG. 1, the mobile communication system according to the present exemplary embodiment is used in a cellular system, and includes a base station 1 and a mobile station 2. Between the base station 1 and the mobile station 2, a radio channel 3 to transmit and receive user data and control data by employing the packet communication can be set. For the access system of the packet communication by the radio channel 3, any type may be applied, and, for example, the CDMA (Code Division Multiple Access) system etc. is employed. The mobile station 2 is configured by a cellular phone, a portable terminal such as a PHS (Personal Handyphone System) or a PDA (Personal Digital Assistant), or a mobile terminal such as an in-vehicle monitor.

Figure 2:
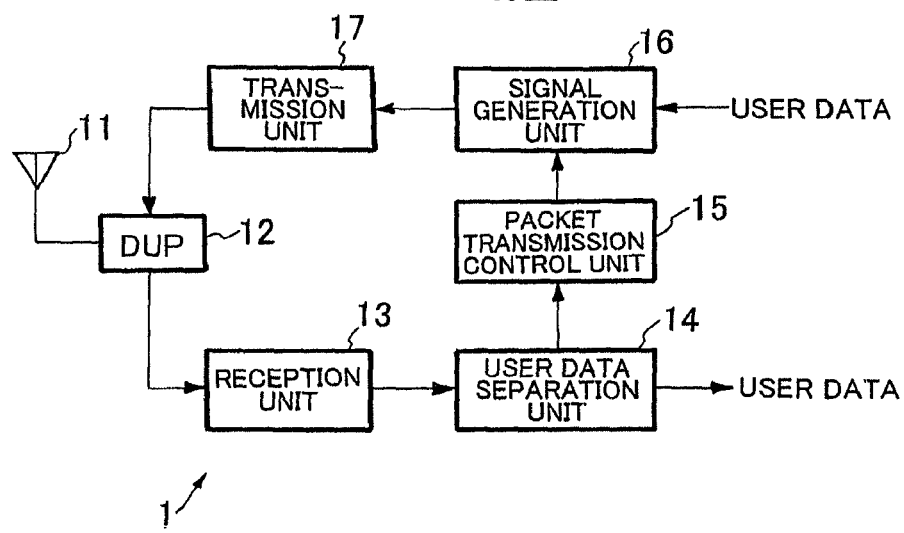
FIG. 2 shows a block diagram indicative of the configuration of a base station according to the first exemplary embodiment of the present invention.

FIG. 2 shows a block diagram indicative of the internal configuration of the base station 1 shown in FIG. 1.

In FIG. 2, the base station 1 includes an antenna 11, a duplexer (DUP) 12 connected to the antenna 11, a reception unit 13 and a transmission unit 17 connected to the DUP 12, and a user data separation unit 14 connected to the output side of the reception unit 13. Furthermore, the base station 1 includes a packet transmission control unit 15 connected to the output side of the user data separation unit 14, and a signal generation unit 16 connected to the output side of the packet transmission control unit 15 and to the input side of the transmission unit 17. As for other configurations, since heretofore known techniques can be applied, the explanation is omitted.

The reception unit 13 receives a signal transmitted from the mobile station 2 using the radio channel 3 through the antenna 11 and duplexer 12, and outputs thus received signal to the user data separation unit 14.

The user data separation unit 14 separates the signal input from the reception unit 13 into user data and a control signal, and outputs the user data to a user data output unit (not shown), and the control information to the packet transmission control unit 15.

The packet transmission control unit 15 sends the reception state of packets which have been transmitted already using the control information separated by the user data separation unit 14 to the signal generation unit 16. Furthermore, in the intermittent reception state of the mobile station 2 using a control cycle to be described later, the packet transmission control unit 15 determines whether or not the state is in a period in which data to be transmitted (new data or retransmission data) can be transmitted (or retransmitted) by employing a method to be described later as an example, and also sends information as to whether or not data can be transmitted being the determination result to the signal generation unit 16.

The signal generation unit 16 determines the transmission possibility and the presence of retransmission of packets based on the information received from the packet transmission control unit 15, and, in case transmission of packets is possible based on the result, outputs user data input from a user data input unit (not shown) to the transmission unit 17. Then, the transmission unit 17 transmits packets being the user data from the antenna 11 through the duplexer 12.

Figure 3:
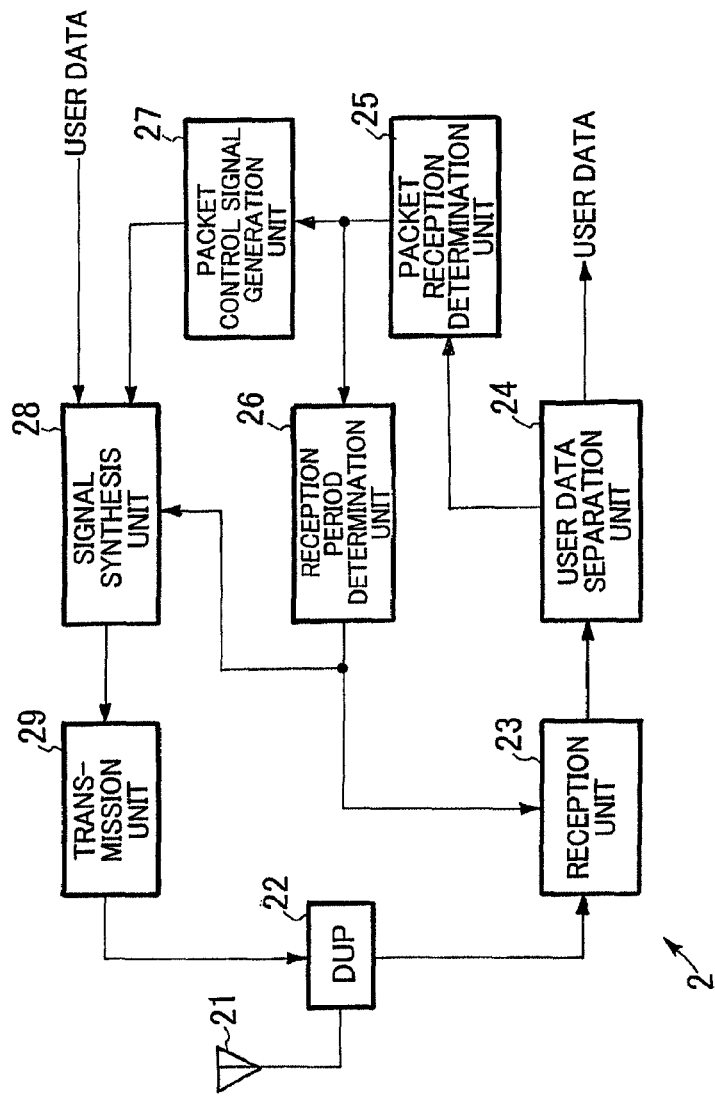
FIG. 3 shows a block diagram indicative of the configuration of a mobile station according to the first exemplary embodiment of the present invention.

FIG. 3 shows a block diagram indicative of the internal configuration of the mobile station 2 shown in FIG. 1.

In FIG. 3, the mobile station 2 includes an antenna 21, a duplexer (DUP) 22 connected to the antenna 21, a reception unit 23 and a transmission unit 29 connected to the DUP 22, and a user data separation unit 24 connected to the output side of the reception unit 23. In addition, the mobile station 2 includes a packet reception determination unit 25 connected to the output side of the user data separation unit 24, a reception period determination unit 26 connected to the output side of the packet reception determination unit 25 and to the input side of the reception unit 23, and a packet control signal generation unit 27 connected to the output side of the packet reception determination unit 25. Furthermore, the mobile station 2 includes a signal synthesis unit 28 connected to the output side of the reception period determination unit 26 and packet control signal generation unit 27 and to the input side of the transmission unit 29. As for other configurations, since heretofore known techniques can be applied, the explanation is omitted.

The reception unit 23 receives a signal transmitted from the base station 1 using the radio channel 3 through the antenna 21 and duplexer 22, and outputs thus received signal to the user data separation unit 24.

The user data separation unit 24 separates the signal input from the reception unit 23 into user data and a control signal, and outputs the user data to a user data output unit (not shown), and outputs the control information to the packet reception determination unit 25, respectively.

The packet reception determination unit 25 determines whether or not user data received from the base station 1 is correctly received based on the control information separated by the user data separation unit 24 by employing an error detection function to be described later as an example, and sends the determination result to the reception period determination unit 26 and packet control signal generation unit 27.

The reception period determination unit 26 determines whether or not the packet reception period should be extended based on the input determination result by employing a method to be described later as an example, and sends the determination result to the reception unit 23 and signal synthesis unit 28.

The packet control signal generation unit 27 generates a reception confirmation signal (reception result notification signal) for packets based on the determination result input from the reception period determination unit 26, and sends the packet reception confirmation signal to the signal synthesis unit 28.

The signal synthesis unit 28 synthesizes the packet reception confirmation signal from the packet control signal generation unit 27 and user data input from a user data input unit (not shown), and outputs thus synthesized signal to the transmission unit 29 based on the determination result by the reception period determination unit 26. Then, the transmission unit 29 transmits packets obtained by synthesizing the packet reception confirmation signal and user data from the antenna 21 through the duplexer 22. In this case, the packet reception confirmation signal and user data are synthesized to be transmitted. On the other hand, they may be separately transmitted without synthesizing them.

At least part of functions of the respective units of the base station 1 and mobile station 2 may be realized by a computer using a program. This program may be read out from a recording medium to be loaded to a computer, or may be transmitted through a communication network to be loaded to a computer.

FIG. 4 shows a flowchart indicative of the operation of the base station 1, and FIG. 5 shows a flowchart indicative of the operation of the mobile station 2. The present exemplary embodiment is equal to the above-described first conventional technique in that a control cycle is set for the transmission period and transmission halt period, or for the reception period and reception halt period. Accordingly, it is assumed that the start timing of the control cycle of the base station 1 and that of the mobile station 2 are known mutually, and the operation will be explained.

Firstly, referring to FIG. 4, the operation of the base station 1 will be explained. This operation is realized when a computer in the base station 1, as a means to accomplish at least part of functions of the respective units of the base station 1 as an example, executes a command of a preset control program (which corresponds to a power-saving transmission and reception program of the base station according to the present invention). In this example, the control program is previously stored in a recording medium such as a ROM (Read Only Memory), and a command thereof is read out to be executed by a computer at the time of the operation.

When starting a power saving mode (intermittent reception state), as shown in FIG. 6A, the base station 1 starts a control cycle Ta for the intermittent reception of the mobile station 2 with a predetermined start timing ta, and starts the transmission with the control cycle Ta. In this case, the base station 1 repeats a packet transmission period Ta1 to transmit packets to the mobile station 2 and a packet transmission halt period Ta2 to halt transmitting packets with the constant control cycle Ta alternately, and controls the packet transmission operation. The control cycle Ta is the total (Ta1+ Ta2) of both the periods Ta1, Ta2 being the unit of the repetition of the packet transmission period Ta1 and packet transmission halt period Ta2. The control cycle Ta remains constant and is not changed during the operation. On the other hand, the ratio of the packet transmission period Ta1 and the packet transmission halt period Ta2 in the control cycle Ta can be dynamically changed during the operation, as will be described hereinafter. Controlling the packet transmission with the control cycle Ta is mainly performed by the respective operations of the packet transmission control unit 15 and signal generation unit 16.

In FIG. 4, after starting the control cycle Ta with the predetermined start timing to (step S101), the base station 1 determines whether or not the period is within a minimum reception period Tbmin (refer to subsequent description) corresponding to the minimum value of a predetermined packet reception period Tb1 (refer to subsequent description) of the mobile station 2 (step S102). This determination is mainly performed by the operation of the packet transmission control unit 15. As the minimum reception period Tbmin, the minimum value of the packet reception period Tb1 which has been previously determined between the base station 1 and the mobile station 2 is used. This minimum value is stored, for example, in a memory (not shown) of the packet transmission control unit 15.

By the determination in step S102, when the determination is YES (within minimum reception period Tbmin), it is determined whether or not packets (retransmission packets or new packets) to be transmitted are detected (step S103). This determination is performed by the signal generation unit 16. As a result, in case packets to be transmitted are detected (step S103: YES), the signal generation unit 16 transmits the corresponding packets through the transmission unit 17, DUP 12, and antenna 11 (step S104), and the processing returns to step S102 to repeat the similar operation. On the other hand, in case packets to be transmitted are not detected (step S103: NO), the processing returns to step S102 to repeat the similar operation.

Next, when the minimum reception period Tbmin elapses, and the determination is NO (not within minimum reception period Tbmin) in step S102, the base station 1 confirms whether or not retransmission packets are present afterward (step S105). The presence or absence of retransmission packets is determined based on a packet reception confirmation signal transmitted from the mobile station 2. The determination in step S105 is mainly performed by the operation of the signal generation unit 16.

Accordingly, when retransmission packets are present (step S105: YES), it is determined whether or not the packet reception period Tb1 (refer to subsequent description) of the mobile station 2 can be extended (step S106). The determination of the extension possibility of the packet reception period Tb1 is performed by comparing the period with a predetermined maximum reception period Tbmax (refer to subsequent description) of the mobile station 2. In this case, in case of being within the maximum reception period Tbmax, it is determined that extension of the packet reception period Tb1 is possible, and, in case of being over the maximum reception period Tbmax, it is determined that extension of the packet reception period Tb1 is impossible. As the maximum reception period Tbmax, the maximum value of the packet reception period Tb1 which has been previously determined between the base station 1 and the mobile station 2 is used. This maximum value is stored, for example, in a memory (not shown) of the packet transmission control unit 15. The determination in step S106 is mainly performed by the operation of the packet transmission control unit 15.

By the determination in step S106, in case extending the packet reception period Tb1 of the mobile station 2 is possible (step S106: YES), the processing goes to step S104, and the signal generation unit 16 transmits corresponding retransmission packets through the transmission unit 17, DUP 12, and antenna 11. In this time period, the packet transmission period Ta1 in the control cycle Ta is extended and updated. Extension of the packet transmission period Ta1 is possible until getting to the maximum reception period Tbmax.

On the other hand, by the determination in step S105, in case retransmission packets are absent (step S105: NO), or, by the determination in step S105, in case the packet reception period Tb1 of the mobile station 2 cannot be extended (step S106: NO), the packet transmission period Ta1 in the control cycle Ta is transferred to the packet transmission halt period Ta2, and transmission of packets is halted. The halt of packet transmission is continued until the packet transmission halt period Ta2 ends, that is, until the control cycle Ta of this time ends (step S107). The processing during this time period is mainly performed by the operations of the packet transmission control unit 15 and signal generation unit 16.

After the control cycle Ta ends in step S107, it is determined whether or not the power saving mode should be ended (step S108). This determination is performed by the operation of the packet transmission control unit 15. As a result, in case of not ending the power saving mode (step S108: NO), the processing returns to step S101 to start the next control cycle Ta, and repeats the similar operation. On the other hand, in case of ending the power saving mode (step S108: YES), transmission with the control cycle Ta is ended.

Next, referring to FIG. 5, the operation of the mobile station 2 will be explained. This operation is realized when a computer in the mobile station 2, as a means to accomplish at least part of functions of the respective units of the mobile station 2 as an example, executes a command of a preset control program (which corresponds to a power-saving transmission and reception program of the mobile station according to the present invention). In this example, a control program is previously stored in a recording medium such as a ROM, and a command thereof is read out to be executed by a computer at the time of the operation.

Similar to the operation of the base station 1, when starting the power saving mode, the mobile station 2 starts a control cycle Tb for the intermittent reception with a predetermined start timing tb corresponding to the start timing to of the packet transmission period Ta1 of the base station 1, and starts the reception with the control cycle Tb. In this case, as shown in FIG. 6B, the mobile station 2 repeats a packet reception period Tb1 to receive packets and a packet reception halt period Tb2 to halt receiving packets with the constant control cycle Tb alternately, and controls the packet reception operation. The control cycle Tb for the intermittent reception is the total (Tb1+Tb2) of both the periods Tb1, Tb2 being the unit of the repetition of the packet reception period Tb1 and packet reception halt period Tb2. The control cycle Tb remains constant and is not changed during the operation. On the other hand, the ratio of the packet reception period Tb1 and the packet reception halt period Tb2 in the control cycle Tb can be dynamically changed during the operation, as will be described hereinafter. Controlling the packet reception with the control cycle Tb is mainly performed by the respective operations of the packet reception determination unit 25, reception period determination unit 26, packet control signal generation unit 27, signal synthesis unit 28, and reception unit 23.

In FIG. 5, when starting the control cycle Tb with the predetermined start timing tb (step S201), the mobile station 2 sets the packet reception period Tb1 in the control cycle Tb to the minimum reception period Tbmin which is the predetermined minimum value (step S202). The set value of the minimum reception period Tbmin is stored, for example, in a memory (not shown) of the reception period determination unit 26.

Next, the mobile station 2 receives packets transmitted from the base station 1 through the antenna 21, DUP 22, and reception unit 23 during the minimum reception period Tbmin being the set packet reception period Tb1, and, at the time the minimum reception period Tbmin ends, confirms whether or not all the received packets are correctly received (step S203). This confirmation is mainly performed by the respective operations of the packet reception determination unit 25 and reception period determination unit 26. In this confirmation, the confirmation whether or not all the received packets are correctly received is performed by, using a known error detection function as an example, detecting whether or not an error is present in the received packets. In this case, when it is detected that an error is not present in the received packets, it is determined that the packets are correctly received, while when it is detected that an error is present in the received packets, it is determined that the packets are not correctly received, that is, the packets are faultily received.

As a result, in case all the packets are correctly received (step S203: YES), the packet reception period Tb1 in the control cycle Tb is transferred to the packet reception halt period Tb2, and receiving packets is halted. The halt of packet reception is continued until the packet reception halt period Tb2 ends, that is, until the control cycle Tb of this time ends (step S204). The processing during this time period is mainly performed by the respective operations of the reception period determination unit 26 and reception unit 23.

On the other hand, in case there are some packets which are not correctly received (step S203: NO), it is determined whether or not the packet reception period Tb1 can be extended (step S205). The determination of the extension possibility of the packet reception period Tb1 is performed by comparing the period with a predetermined maximum reception period Tbmax. In this case, the maximum reception period Tbmax may be a value so long as the value is not over the control cycle Tb. The determination in step S205 is mainly performed by the operation of the reception period determination unit 26.

By the determination in step S205, in case extending the packet reception period Tb1 is possible (step S205: YES), the packet reception period Tb1 is extended and updated (step S206). The packet reception period Tb1 is updated by updating the set value of the minimum reception period Tbmin stored, for example, in a memory (not shown) of the reception period determination unit 26.

Next, it is confirmed whether or not all the retransmission packets transmitted from the base station 1 through the antenna 21, DUP 22, and reception unit 23 are correctly received during the updated packet reception period Tb1 (step S207). This confirmation is mainly performed by the operation of the reception period determination unit 26.

As a result, in case all the retransmission packets are correctly received during the updated packet reception period Tb1 (step S207: YES), the packet reception period Tb1 in the control cycle Tb is transferred to the packet reception halt period Tb2, and halts receiving packets. The halt of packet reception is continued until the packet reception halt period Tb2 ends, that is, the control cycle Tb of this time elapses (step S204). The processing during this time period is mainly performed by the respective operations of the reception period determination unit 26 and reception unit 23.

On the other hand, in case all the retransmission packets are not correctly received during the updated packet reception period Tb1 (step S207: NO), the processing returns to step S205 to repeat the similar operation, and the updated packet reception period Tb1 is further extended and updated.

FIG. 7A to FIG. 7D show schematic views indicative of the state of the extension of the packet reception period Tb1.

Figure 7A:
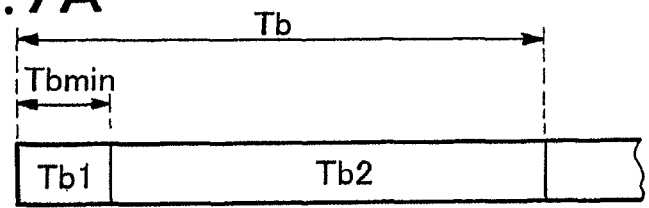
FIG. 7A to FIG. 7D show schematic views indicative of the state of the extension of the packet reception period.
Figure 7B:
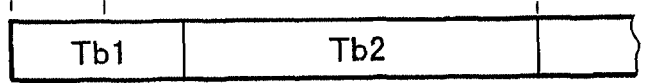
Figure 7C:
Figure 7D:
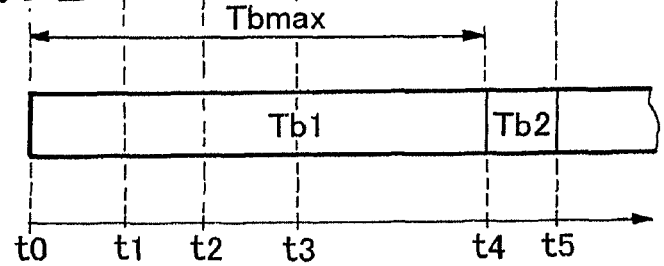

In the example shown in FIG. 7A, the packet reception period Tb1 starts at a start timing t0 of the control cycle Tb, and ends at an end time point t1 of the minimum reception period Tbmin. On the other hand, in the example shown in FIG. 7B, the packet reception period Tb1 starts at the start timing t0 of the control cycle Tb, and ends at an extended time point t2 which is a time point extended from the end time point t1 of the minimum reception period Tbmin. Furthermore, in the example shown in FIG. 7C, the packet reception period Tb1 starts at the start timing t0 of the control cycle Tb, and ends at an extended time point t3 which is a time point further extended from the extended time point t2. Moreover, in the example shown in FIG. 7D, the packet reception period Tb1 starts at the start timing t0 of the control cycle Tb, and ends at an end time point t4 of the maximum reception period Tbmax.

In this way, the extension of the packet reception period Tb1 is updated dynamically between the minimum reception period Tbmin and the maximum reception period Tbmax in the control cycle Tb. In the example shown in FIG. 7D, for the sake of convenience in explanation, the maximum reception period Tbmax is set shorter than the control cycle Tb. On the other hand, the maximum reception period Tbmax may be set equal to the control cycle Tb at a maximum.

After the control cycle Tb ends in step S204, it is determined whether or not the power saving mode should be ended (step S208). As a result, in case of not ending the power saving mode (step S208: NO), the processing returns to step S101 to start the reception by the next control cycle Tb, and repeats the similar operation. On the other hand, in case of ending the power saving mode, reception with the control cycle Tb is ended.

In this way, according to the present exemplary embodiment, in starting the control cycle Tb of the intermittent reception, in case all the packets received during the minimum reception period Tbmin are correctly received, the mobile station 2 can transfer the packet reception period Tb1 to the packet reception halt period Tb2 automatically when the minimum reception period Tbmin ends, and halt receiving packets. In this way, the mobile station 2 can automatically transfer to the reception halt state without receiving an explicit designation signal (reception halt notification signal) from the base station. Similarly, during the extended period of the packet reception period Tb1 in the control cycle Tb after the minimum reception period Tbmin elapses, since it is determined whether or not all the packets are successfully received, the mobile station 2 can automatically transfer to the reception halt state without receiving an explicit designation signal from the base station.

Accordingly, the mobile station 2 does not have to receive the reception halt notification signal from the base station 1, and a time period before receiving the reception halt notification signal can be halted. In this way, a situation in which, although there is no occasion to receive packets, the reception processing is continued and useless power is undesirably consumed can be considerably prevented.

Furthermore, in the above-described conventional technique, in case of receiving the reception halt notification signal, when the notification signal is faulty, the packet reception period Tb1 continues. On the other hand, according to the present exemplary embodiment, since the reception halt notification signal is unnecessary, the problem that the packet reception period Tb1 continues due to the faulty notification signal can be solved. As a result, in the constant control cycle Tb, the packet reception halt period Tb2 can be made long relatively with respect to the packet reception period Tb1, which can reduce the power consumption.

Second Exemplary Embodiment

Figure 8:
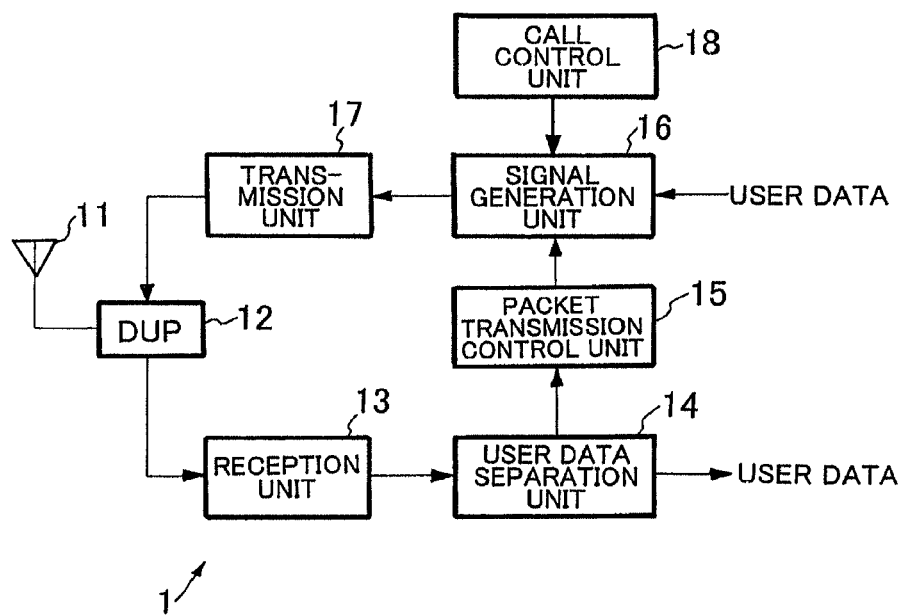
FIG. 8 shows a block diagram indicative of the configuration of a base station according to the second exemplary embodiment of the present invention.
Figure 9:
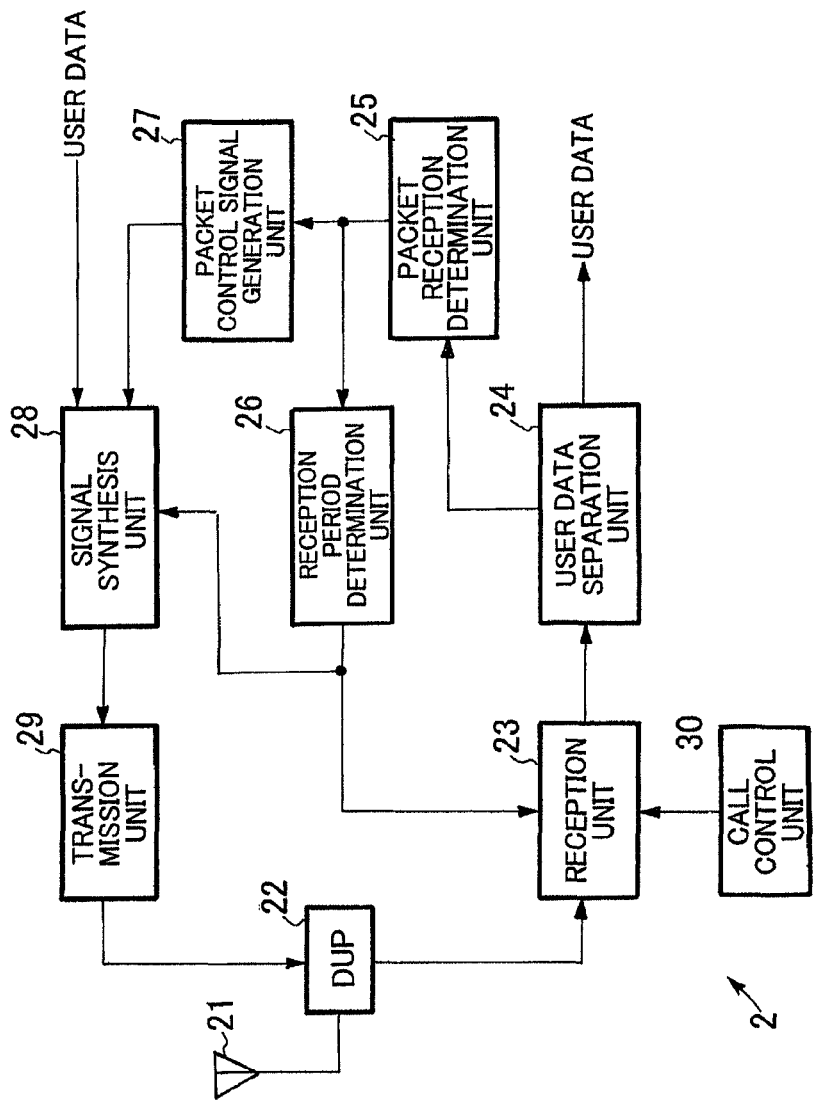
FIG. 9 shows a block diagram indicative of the configuration of a mobile station according to the second exemplary embodiment of the present invention.
Figure 12:
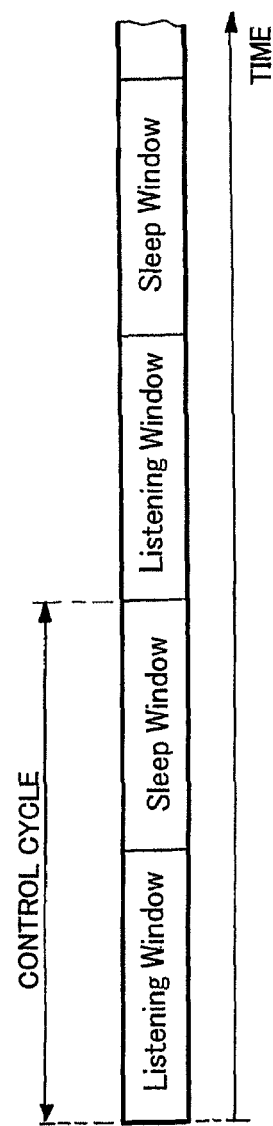
FIG. 12 shows a schematic diagram to explain the intermittent reception system using the Listening Window and Sleep Window of a conventional example.

FIG. 8 shows a block diagram indicative of the configuration of a base station of a mobile communication system according to the second exemplary embodiment of the present invention. FIG. 9 shows a block diagram indicative of the configuration of a mobile station of the mobile communication system.

In FIG. 8, a call control unit 18 is added to the configuration of the above-described base station shown in FIG. 2. Similarly, in FIG. 9, a call control unit 30 is added to the configuration of the above-described mobile station shown in FIG. 3. Other configurations are similar to those in the first exemplary embodiment, and the same reference numerals are appended thereto and detailed explanation of which will be omitted.

In the base station 1 shown in FIG. 8, the call control unit 18 determines whether or not a reception halt signal should be transmitted to the mobile station 2 depending on a service to be communicated. For example, the base station 1 determines a communication service (step S301), as shown in FIG. 10, and, in case the communication service corresponds to a service that performs real-time communication such as the VoIP, in order to perform the operation of the intermittent reception of the mobile station 2, the base station 1 does not transmit the reception halt signal (step S302). On the other hand, in case the communication service corresponds to a service that performs non-real-time communication such as the FTP (File Transfer Protocol) or Web browsing, the operation of the intermittent reception of the mobile station 2 is not performed, and the base station 1 transmits the reception halt signal after it is confirmed that the mobile station 2 can receive a signal using the reception confirmation signal from the mobile station 2 (step S303).

On the other hand, in the mobile station 2 shown in FIG. 9, the call control unit 30 switches the operation of the reception unit 23 depending on a communication service. For example, the call control unit 30 determines a communication service (step S401), as shown in FIG. 11, and, in case the communication service corresponds to a service that performs real-time communication such as the VoIP, executes the operation of the intermittent reception similar to the above-described first exemplary embodiment without receiving the notification of the reception halt signal (step S402). On the other hand, in case the communication service corresponds to a service that performs non-real-time communication such as the FTP or Web browsing, the mobile station 2 does not perform the operation of the intermittent reception, and is made to transfer to the reception halt state after receiving the reception halt signal from the base station 1 (step S403).

While the respective operations of the base station 1 and mobile station 2 are switched depending on a communication service, since the setting of a communication service and the operation in case of the non-real-time communication can be realized using heretofore known techniques, and explanation of which will be omitted.

In this case, in the non-real-time communication, the transmission cycle for data is not constant. Accordingly, when the mobile station automatically transfers to the reception halt state, there is raised a possibility that the delay becomes large since the reception is halted at a timing when the reception is not originally halted. As a result, influence on the characteristics such as the throughput becomes large. Thus, in the non-real-time communication, it is required to send the reception halt notification from the base station to the mobile station. On the other hand, in the real-time communication, data is transmitted with a substantially constant cycle. Thus, when data can be received within a constant period, there is no influence on the characteristics even if the reception is halted afterward, and it is not necessarily required to send the reception halt notification from the base station to the mobile station.

In this way, according to the present exemplary embodiment, since the automatic halt is not performed in the non-real-time communication, the problem of the lowering of the throughput can be prevented. Furthermore, by employing the present invention to the real-time communication, as compared with the case of employing the present invention to the non-real-time communication, the effect of elongating the reception halt period becomes significantly large by automatically halting reception.

In the above-described exemplary embodiment, while the call setting unit is arranged in both the base station and mobile station, a similar operation is possible when the call setting unit is arranged in any one of the base station and mobile station.

Furthermore, in the above-described exemplary embodiment, the operation of the intermittent reception is not performed when a communication service is the non-real-time communication, and the operation of the intermittent reception is performed when a communication service is the real-time communication. The control is changed in the non-real-time communication and real-time communication. The present invention is not restricted to this, and may be applied to a case in which the control is changed according to the sort of communication services, that is, the operation of the intermittent reception is performed for specific communication services and the operation of the intermittent reception is not performed for other communication services.

For example, it is possible to change the control for the case in which the communication of a communication service is high in priority and for the case in which the communication of a communication service is low in priority. In this case, the control may be performed so that, in case the communication of a communication service is high in priority, the operation of the intermittent reception is not performed similar to the case of the non-real-time communication, while in case the communication of a communication service is low in priority, the operation of the intermittent reception is performed similar to the case of the real-time communication.

As described above, while the respective exemplary embodiments according to the present invention have been described, the present invention is not limited to the above-described representative exemplary embodiments. It should be understood by those ordinary skilled in the art that various modifications and alternative constructions can be implemented without departing from the scope and spirit of the present invention based on the appended claims, and these modifications and alternative constructions belong to the range of right of the present invention.

INDUSTRIAL APPLICABILITY

The present invention can be applied to a mobile communication system, a base station, a mobile station, and a power-saving transmission and reception method and a power-saving transmission and reception program used in them. Especially, the present invention can be applied to a mobile communication system which changes the ratio of the packet reception period and the packet reception halt period according to the situation of receiving packets so as to save electric power of a mobile station, a base station, a mobile station, and a power-saving transmission and reception method and a power-saving transmission and reception program used in them.

What is claimed is:

1. A mobile station configured to communicate with a base station using a radio channel, the mobile station comprising:
   at least one processor configured to execute:
      a switching unit configured to switch between a packet reception period, during which packet reception can be executed, and a packet reception halt period, during which packet reception is halted;
      a transmission unit configured to transmit, to the base station, a result of receiving a downlink packet sent from the base station, as a reception result notification signal according to a Hybrid Automatic Request (HARQ) process; and
      a reception period determination unit configured to extend the packet reception period if a packet reception fault is determined,
   wherein the packet reception period is capable of being extended to a next packet reception period.

2. A mobile station according to claim 1,
   wherein the reception period determination unit is configured to extend the packet reception period gradually according to the reception result.

3. A communication method for a mobile station which communicates with a base station using a radio channel, the method comprising:
   switching between a packet reception period, during which packet reception can be executed, and a packet reception halt period, during which packet reception is halted;
   transmitting to the base station, a result of receiving a downlink packet sent from the base station, as a reception result notification signal according to a Hybrid Automatic Request (HARQ) process; and extending the packet reception period if a packet reception fault is determined, wherein the packet reception period is capable of being extended to a next packet reception period.

4. A mobile station configured to communicate with a base station using a radio channel, the mobile station comprising:

- at least one processor configured to execute:
  - a switching unit configured to switch between a packet reception period, during which packet reception can be executed, and a packet reception halt period, during which packet reception is halted;
  - a transmission unit configured to transmit, to the base station, a result of receiving a downlink packet sent from the base station, as a reception result notification signal according to a Hybrid Automatic Request (HARQ) process; and
  - a reception period determination unit configured to increase the packet reception period if a packet reception fault is determined, wherein the packet reception halt period after the packet reception period is shortened if the packet reception period is increased.

5. A communication method for a mobile station which communicates with a base station using a radio channel, the method comprising:

- switching, by the mobile station, between a packet reception period, during which packet reception can be executed, and a packet reception halt period, during which packet reception is halted;
- transmitting to the base station, a result of receiving a downlink packet sent from the base station, as a reception result notification signal according to a Hybrid Automatic Request (HARQ) process; and
- increasing the packet reception period if a packet reception fault is determined, wherein the packet reception halt period after the packet reception period is shortened if the packet reception period is increased.

6. A mobile station according to claim 1, wherein the mobile station further comprises:

- a packet reception determination unit configured to determine the packet reception fault.

7. A mobile station according to claim 4, wherein the mobile station further comprises:

- a packet reception determination unit configured to determine the packet reception fault.

* * * * *